G. REHFUSS.
Sewing-Machine.
No. 205,904.  Patented July 9, 1878.
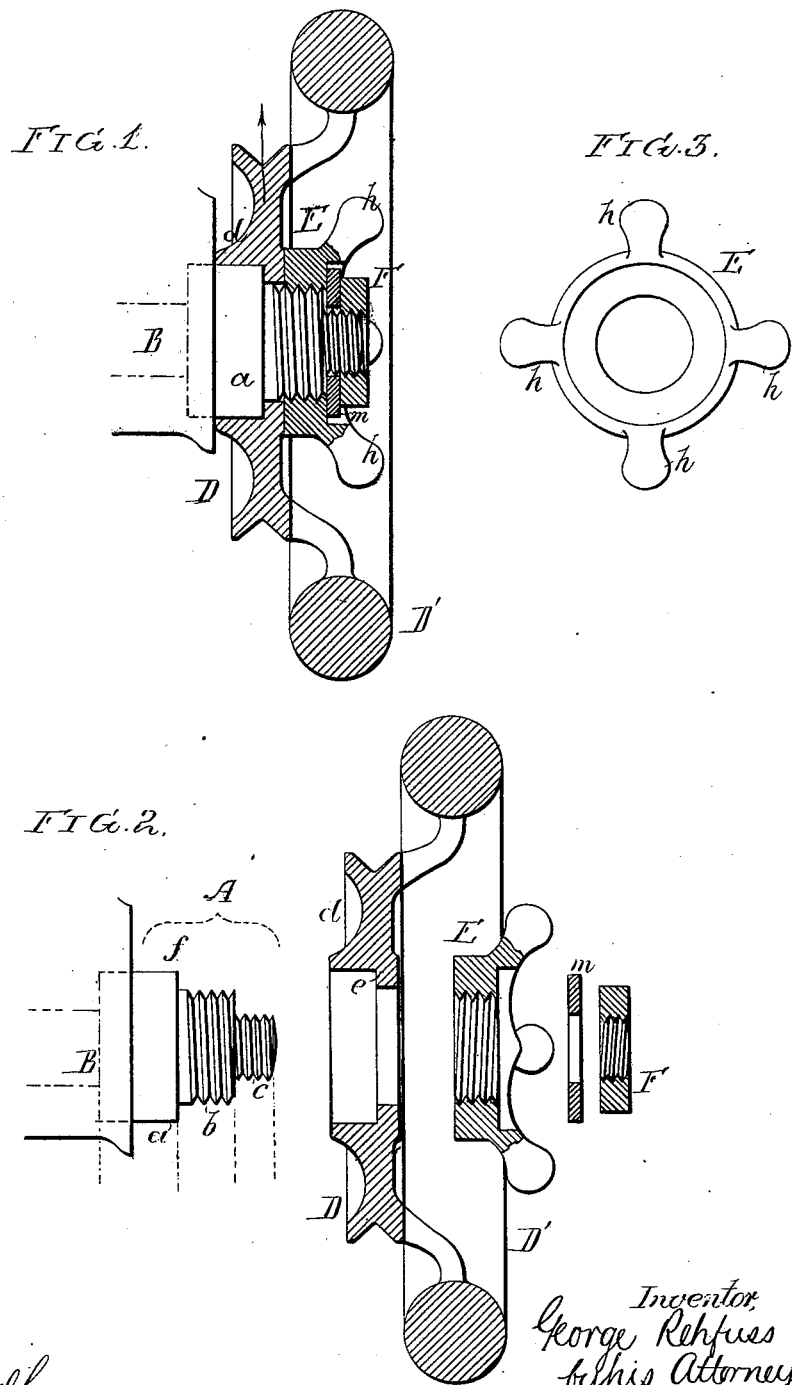
Witnesses,
Thomas McIlvain
Harry Smith
Inventor,
George Rehfuss
by his Attorneys
Howson and Son

UNITED STATES PATENT OFFICE.

GEORGE REHFUSS, OF PHILADELPHIA, PENNSYLVANIA, ASSIGNOR TO THE AMERICAN BUTTON HOLE, OVERSEAMING, AND SEWING MACHINE COMPANY, OF SAME PLACE.

IMPROVEMENT IN SEWING-MACHINES.

Specification forming part of Letters Patent No. 205,904, dated July 9, 1878; application filed March 29, 1878.

*To all whom it may concern:*

Be it known that I, GEORGE REHFUSS, of Philadelphia, Pennsylvania, have invented a new and useful Improvement in Sewing-Machines, of which the following is a specification:

The object of my invention is to combine the driving-pulley of a sewing-machine with a driving-shaft and with devices described hereinafter, whereby the driving-pulley can be secured to the said shaft, or allowed to run loose on the same, so that the driving-pulley and its fly-wheel may be used for winding purposes without turning the shaft and operating the moving parts of the sewing-machine.

In the accompanying drawing, Figure 1 is a view of my improved clutching and releasing device for the driving-pulley of a sewing-machine; Fig. 2, the same, showing the parts detached from each other; and Fig. 3, a face view of one of the nuts.

A represents that end of the driving-shaft of a sewing-machine which projects from the rear of the frame B, this end having a plain collar, $a$, the reduced threaded portion $b$, and the portion $c$, which is still further reduced and threaded.

The hub $d$ of the driving-pulley D is fitted snugly, but so as to turn freely under the circumstances explained hereainfter, on the plain portion $a$ of the shaft, the hub having an internal shoulder, $e$, for bearing against the shoulder $f$ on the said shaft.

To the threaded portion $b$ of the shaft is adapted a nut, E, which is provided with projections $h$, so that it can be conveniently manipulated, this nut being arranged to bear against the outer face of the hub of the pulley.

A second nut, F, is adapted to the threaded portion $c$ of the driving-shaft, this nut being arranged adjacent to the nut E, and bearing, in the present instance, against a washer, $m$, intervening between the two nuts.

As shown in Fig. 1, the internal shoulder $e$ of the hub of the pulley has been forced by the nut E against the shoulder $f$ of the shaft, to which the pulley is consequently secured, and is therefore in a condition to serve as a medium for driving the operating parts of the sewing-machine.

When the pulley D and its fly-wheel D', forming a part of the pulley, have to be used for winding purposes without moving the operating parts of the sewing-machine the nut E is turned back, so as not to bear hard against the hub of the pulley, when the said pulley will be at liberty to turn freely on the shaft, on which it is retained longitudinally in one direction by the shoulder $f$ of the shaft, and in the opposite direction by the nut E, when the friction-pulley of the winding apparatus may be brought to bear against the periphery of the fly-wheel, and the winding may be conducted without disturbing the operating parts of the machine.

A slight turn of the nut E will force the shoulder $e$ of the pulley against the shoulder $f$ of the shaft. Indeed, the force applied by the band to turn the pulley tends to tighten the nut after it has once been brought into contact with the outer face of the pulley.

I claim as my invention—

The combination of the driving-shaft A of a sewing-machine, having a collar, $a$, and threaded portions $b$ and $c$, with the loose pulley D, the nut E, adapted to the thread $b$, and having arms $h$, washer $m$, and the nut F, adapted to the thread $c$, and serving as a stop for the nut E, as set forth.

In testimony whereof I have signed my name to this specification in the presence of two subscribing witnesses.

GEO. REHFUSS.

Witnesses:
HARRY A. CRAWFORD,
HARRY SMITH.